United States Patent
Lyons et al.

(10) Patent No.: US 6,608,698 B1
(45) Date of Patent: Aug. 19, 2003

(54) PRINTING APPARATUS AND METHOD FOR SAVING PRINTING MATERIAL

(75) Inventors: Michael Lyons, Saint Joseph de Riviére (FR); Yifeng Wu, Palaiseau (FR); Stephane Berche, Paris (FR)

(73) Assignee: Oce-Industries S.A., Creteil Cedex (FR)

(*) Notice: Subject to any disclaimer, the term of this patent is extended or adjusted under 35 U.S.C. 154(b) by 0 days.

(21) Appl. No.: 09/125,868
(22) PCT Filed: Mar. 12, 1997
(86) PCT No.: PCT/IB97/00243
§ 371 (c)(1),
(2), (4) Date: Oct. 27, 1998
(87) PCT Pub. No.: WO97/35278
PCT Pub. Date: Sep. 25, 1997
(51) Int. Cl.[7] .............................................. G06F 15/00
(52) U.S. Cl. ...................... 358/1.2; 358/1.1; 358/1.5; 358/1.8; 358/1.4; 358/1.15; 347/19; 347/81
(58) Field of Search ........................ 358/1.2, 1.1, 1.8, 358/1.5, 1.15, 1.16, 1.4, 1.18; 347/19, 81

(56) References Cited

U.S. PATENT DOCUMENTS

| | | | | |
|---|---|---|---|---|
| 5,483,625 A | * | 1/1996 | Robertson et al. | 358/1.18 |
| 5,502,792 A | * | 3/1996 | Chen et al. | 358/1.8 |
| 5,644,344 A | * | 7/1997 | Haselby | 347/19 |

* cited by examiner

*Primary Examiner*—Mark Wallerson
*Assistant Examiner*—Twyler Lamb
(74) *Attorney, Agent, or Firm*—Birch, Stewart, Kolasch & Birch, LLP

(57) ABSTRACT

A method and apparatus for printing rasterized images while economizing printing resources, on the basis of input image data corresponding to a predetermined original format, are provided. The method includes reducing the input image relative to the original format; on the basis of the reduced-scale image, forming a raster of image points each defining either a point to be printed or a blank point of the rasterized image; enlarging the raster of points to return to the original format by inserting blank image points in the reduced raster by a predetermined filling procedure; and printing the image on the basis of the point raster enlarged to the original format.

29 Claims, 11 Drawing Sheets

PRINTING APPARATUS AND METHOD FOR SAVING PRINTING MATERIAL

This application is the national phase under 35 U.S.C. §371 of prior PCT International Application No. PCT/IB97/00243 which has an International filing date of Mar. 12, 1997 which designated the United States of America, the entire contents of which are hereby incorporated by reference.

BACKGROUND OF THE INVENTION

1. Field of the Invention

The present invention relates to a method of printing raster images while economizing printing material, starting from input image data corresponding to a predetermined original format and comprising the step of forming a raster of image points in which the rows and columns are reduced by a factor n with regard to the raster in the standard mode and in which each image point defines either a point to be printed or a blank point of the rasterised image, for use with color or monochrome printers that operate by means of a raster, such as ink jet printers or laser printers, and also thermal or electrostatic printers. The invention also relates to a printer of the above-specified type enabling such a method to be implemented.

2. Discussion of Background Art

With raster-printing printers, a matrix of elementary points is created in memory on the basis of input image data. Each matrix point is indexed to a determined point of the print output raster. It has a binary value that determines whether the corresponding point in the raster is to be linked (a printed point or "dot") or left white (a blank point).

Input image data is generally of three types: vectors, gray-level rasters, and binary rasters.

Data in vector form defines lines to be printed by specifying a start point and an end point in a coordinate plane.

Data in gray-level raster form defines a mosaic of image points in a matrix that is configured in rows and columns, where each element has an intensity value allocated thereto in the range of white to black.

Data in binary form is made up of rasters as in the preceding case, but there are only two possible values for each point of the image, corresponding either to a point that is printed as a dot or to a point in the raster image that is left blank. A half-tone appearance can be rendered by modulating the density of printed points.

In certain applications, it is often necessary to print several drafts for visual inspection before printing a final version. For printing drafts, it is common-place to use draft-mode printing, i.e. printing a relatively low print density so as to reduce the running cost of the printer and also extend the number of sheets it can print.

Numerous known printing methods exist for reducing consumption of printing material in an economic print mode.

For example, it is proposed in document JP-A-52 61973 to define a print zone in the form of a matrix of image points over which a patterned mask is superposed electronically to prevent certain points being printed, depending on the pattern.

In another method described in document JP-A-62 212 164, all even-numbered points in consecutive runs of image points to be printed are replaced by blank points in the row direction.

In next another method described in document EP-A-625 765, a mask pattern is generated which is applied to the image data prior to printing to reduce the number of dots actually printed.

In next another method described in document EP-A-582 434, the raster data are depleted in horizontal direction (dot reduction) and the head scans the row at higher rate, so the printed size of a page is not changed.

In methods of those types, based on eliminating in a systematic manner some of the points that are to be printed there is the risk of completely deleting from the printed output certain patterns defined by fine rows or by isolated points.

Other known methods operate by selectively eliminating points for printing by taking account of the immediate graphics environment, in order to reduce the risk of unwanted deletion.

For example, document EP-A-689 159 proposes to form a raster of image points in which the rows and columns are reduced by a factor n with regard to the raster in the standard mode each image point defining either a point to be printed or a blank point of the rasterized image, which raster is logically combined with a set of three-pixel bits held both in vertical and horizontal direction with the pixel of interest being located in the center, to perform dot reduction on the basis of detected edge patterns.

Document U.S. Pat. No. 5,390,290 proposes an ink-saving print method in which one point out of every three points to be printed is eliminated from a matrix of points according to the following rule: for three, not necessarily consecutive, points to be printed, the first point is retained, and the second and third points are eliminated and replaced by a new point situated halfway between the two points that are eliminated.

In another method described in document U.S. Pat. No. 5,270,728, seeking in particular to avoid unnecessary overlap between printed dots, every other point is eliminated in each consecutive run of points to be printed along each row, with odd rows being scanned in one direction and even rows in the opposite direction.

There also exist printing methods which seek more specifically to reduce printing time, either by spacing out dots or by eliminating a fraction of them using criteria analogous to those described above.

All of those known methods eliminate image points from the matrix of binary points formed from input graphics data. However, the process whereby a matrix of binary points is formed, particularly from graphics data in the form of vectors or rasters of gray levels, itself gives rise to a certain amount of degradation of image information, since it proceeds by approximation. Eliminating points from the matrix can only accentuate that degradation of information.

As a result, during printing, prior art techniques lead all too often to fine rows or to sets of isolated points being lost. However, it is important to be able to reproduce patterns of that kind reliably, even in print economy mode. This applies particularly to images having a high concentration of details carrying technical information, in particular in engineering, e.g. for printing electronic circuit layouts.

Furthermore, determining which points to eliminate from the matrix of points requires considerable amounts of computation time and of memory space, which adversely affects printing time.

The object of the invention is to make it possible, in a draft print mode, to print images with considerable savings of printing material, while ensuring that all of the essential elements in the supplied image data are reproduced, the method also being fast, and sparing in memory space requirements.

To this end, the method according to the preamble is characterized in that it furthermore comprises the following successive steps:

enlarging said raster of points to return to the original format by inserting blank image points in the reduced raster by a predetermined filling procedure; and printing the image on the basis of the point raster enlarged to the original format.

It will be observed that the method of the invention makes it possible to operate on an image of reduced size, thereby reducing both the processing time necessary and memory capacity required for the step of forming the point matrix.

The savings in printing material come from the reduction of the input image which, since it has a format that is smaller in terms of image area, makes it possible to obtain a corresponding reduction in consumption of printing material. Energy savings are particularly significant with thermal printers.

Reducing the input image does indeed lead to an inevitable loss of definition. However, the image retains the essence of its information content, thereby making it possible to maintain sufficient image quality in the output print, e.g. to verify its graphics content and layout.

Also, the method does not require points for printing to be eliminated from the point matrix, as is the case with conventional printing techniques for economizing print. As a result, the graphics information is better restored in the printed image.

The input image is advantageously reduced by a scale factor of n, where n is a real number.

For a relatively simple implementation of the invention, the scale factor n can be an integer equal to or greater than 2, and preferably equal to 2.

When the scale factor n is an integer, the step of enlarging the raster may consist an integer equal to or greater than 2, and preferably equal to 2.

When the scale factor n is an integer, the step of enlarging the raster may include adding n-1 blank image point(s) between two points in each row of image points in the reduced raster, and n-1 row(s) of blank points between two rows of image points in the reduced raster.

When the input data is in the form of vectors specified in a coordinate plane, the reduction step may include dividing the definition of the input image by n.

When the input data is in the form of a raster, the reduction step may include forming a reduced raster in which each point is given a representative value based on the data in a neighborhood zone of the input raster and having topographical correspondence with the point. Several techniques that are known per se may be employed for this purpose.

In a preferred embodiment of the invention, this neighborhood zone is constituted by an n×n block of points constituted by n contiguous image points in the row direction and n contiguous points in the column direction of the input raster.

When the input raster is a gray-level raster, the representative value may be an average of the gray levels in the neighborhood zone.

When the input raster is a binary raster in which each point has one or the other of two values defining a point to be printed and a blank point, the representative value is advantageously derived from the points in the neighborhood zone in which such a manner as to avoid eliminating fine patterns. When the neighborhood zone is a 2×2 point block, the representative value corresponds, for example, to a point to be printed if half or more of the points in the block are points to be printed, and otherwise it corresponds to a blank point. It is preferable, however, for the representative value to be calculated so as to give the representative value the value of a point to be printed when:

half or more of the points of the block define a point to be printed; or one point only of the block is a point to be printed and the block is the N.m-th block in a run of not-necessarily consecutive blocks each containing only one point to be printed, where the blocks are counted by any systematic counting techniques, where N is a run of integers 1, 2, 3, . . . , and where m is a predetermined integer such that the reduced raster includes one point to be printed for each set of m input raster blocks containing only one point to be printed in each block, in order to avoid systematically eliminating isolated points to be printed in the input raster.

Under such circumstances, the number m is preferably equal to 4.

This variant is particularly effective when the binary input rasters contain numerous isolated points for printing which would otherwise run the risk of being systematically eliminated. It often happens that input binary image rasters are themselves generated by image processing in which a half-tone appearance is generated by space modulation of the points to be printed (dithering), which gives rise to rather a larger number of isolated points for printing.

Using the values n=2 and m=4, one in four of the isolated points in the binary raster will still be printed. It is thus possible to maintain a printing material saving of 75% while retaining a sufficiently large number of isolated points for them to reproduce satisfactorily the half-tone appearance of the original image.

For color printing, the steps of reducing the image, of forming the raster of points, and of enlarging the raster can be performed for each color component, and possibly also the black component, of the image to be printed.

The invention also provides apparatus for printing raster images while economizing print, based on the above method.

BRIEF DESCRIPTION OF THE DRAWINGS

The invention will be better understood and the advantages that stem therefrom will appear more clearly on reading the embodiments described below by way of non-limiting indication and with reference to the accompanying drawings, in which.

DETAILED DESCRIPTION OF THE PREFERRED EMBODIMENT

Before explaining the print method of the present invention in detail, the characteristics of an ink-jet printer with which the method can be used are described briefly, it being recalled that the method can be implemented with other types of printers or devices equipped with printing functions, in particular laser printers, electrostatic printers, or thermal printers.

Figure 2:
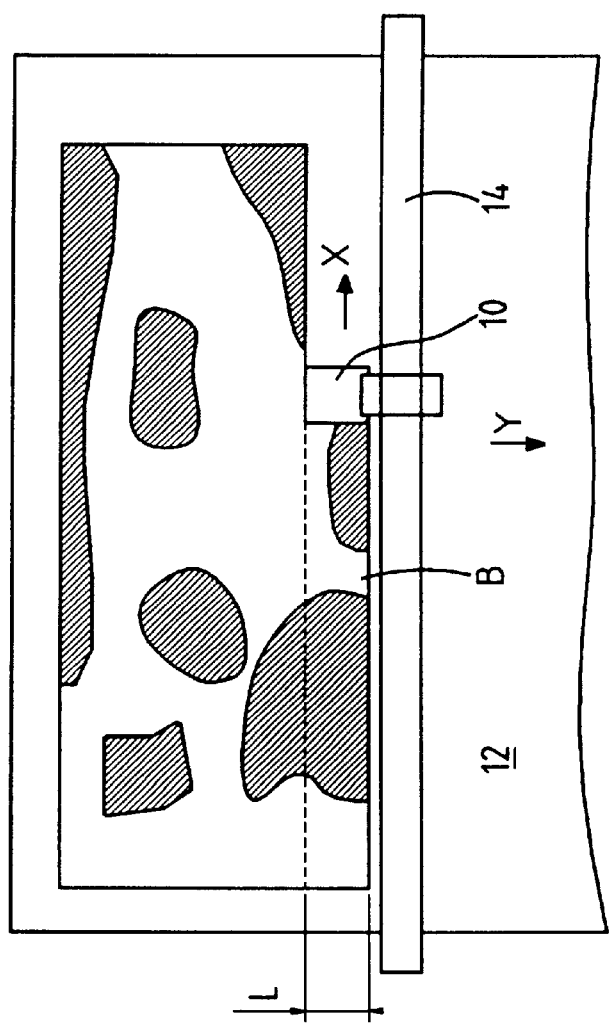
FIG. 2 is a diagram showing a portion of the ink-jet printer including the print head of FIG. 1.
Figure 1:
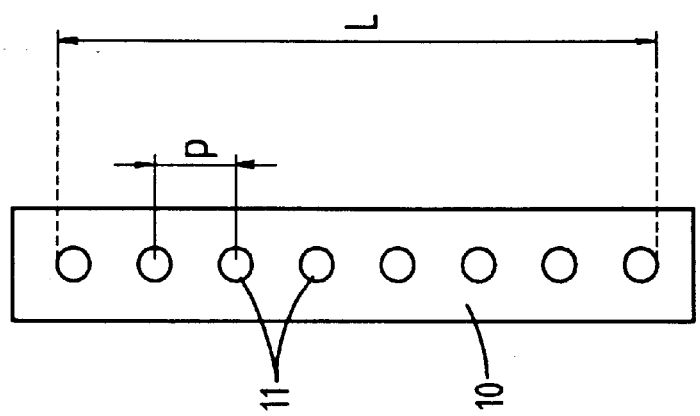
FIG. 1 is a highly diagrammatic representation of a print head of an ink-jet printer according to an embodiment of the present invention.

FIGS. 1 and 2 are diagrammatic representatives respectively of a print head 10 of an ink-jet printer, and of the portion of the printer in which the head 10 is located.

The print head 10 comprises a line of nozzles 11, each capable of ejecting independently and in controlled manner a droplet of ink onto a print medium 12, e.g. a sheet of paper. The print head 10 is movable in an X direction along a beam 14 which extends transversely relative to the sheet 12. The sheet is displaced in a Y direction perpendicularly to the X direction. The line of nozzles 11 in the print head extends in the Y direction. It may alternatively be slightly inclined relative to this direction.

An image is reproduced by scanning successive strips B of width L by moving the head 10 along the X direction (main scan). During a scan pass, ink ejection is controlled to reproduce the desired image in the form of ink dots. After each pass, the number of rows of points is equal to the number of nozzles 11, and definition in the Y direction is determined by the pitch p of the nozzles. After each pass, the sheet 12 is advanced in the -Y direction (secondary scan) and the print head 10 is caused to perform a new scan pass.

The displacements of the print head 10 and of the sheet 12, and the ejection of ink are all performed by means that are well known and which need not be described herein.

The input image data can be encoded in vector form, in gray-level raster form, or in binary raster form. The main characteristics of each of these forms of encoding are briefly explained below.

Figure 3A:
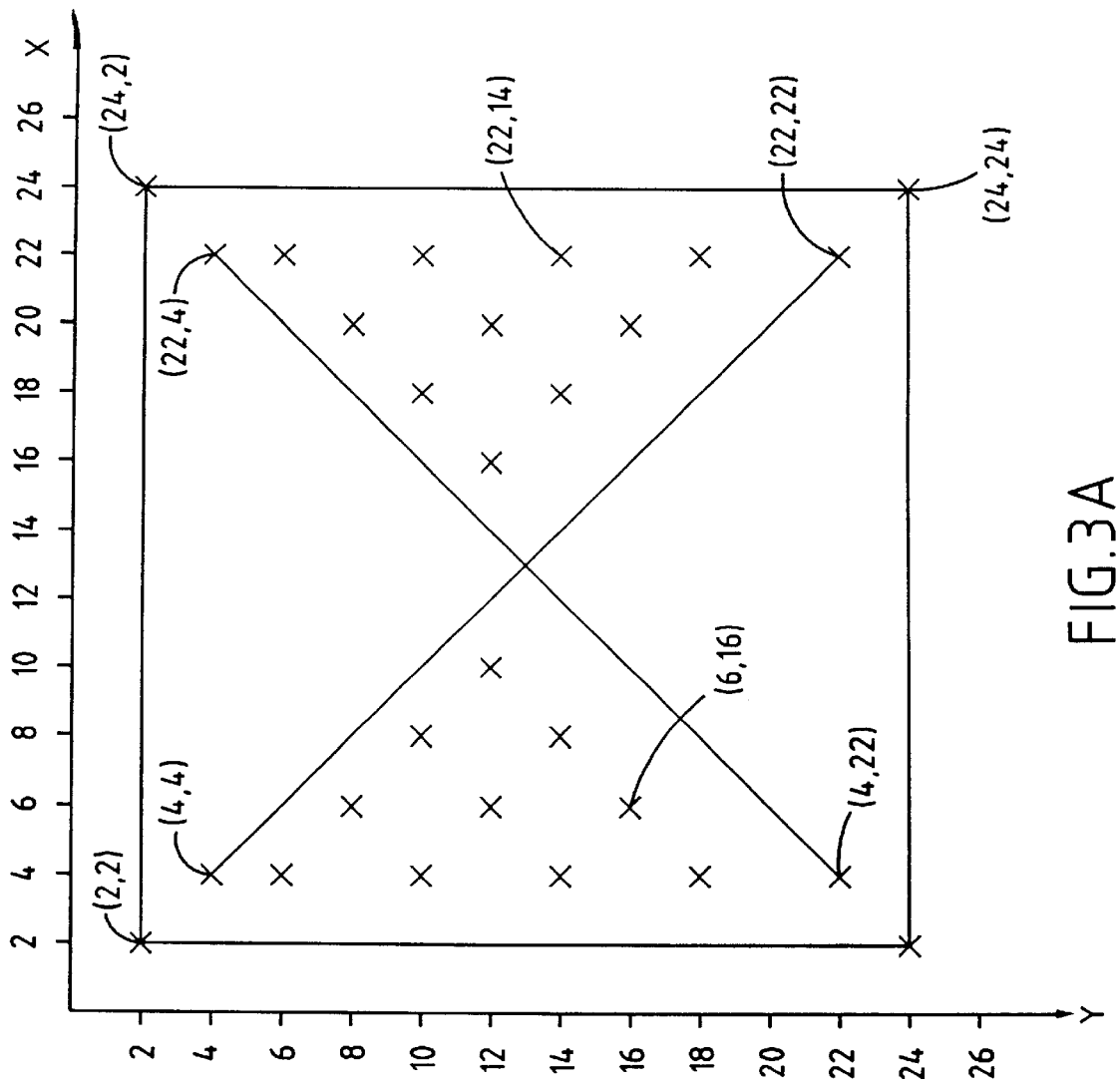
FIG. 3A shows a vector pattern in a coordinate plane and as defined by input image data according to an embodiment of the present invention.

FIG. 3A is a graphical representation of an example of data in vector form. The vectors are defined by the coordinates of their start and end points in an X, Y coordinate plane.

The vectors are written in a matrix of individual cells, each having a specific address given by its (X, Y) coordinates, the matrix being indexed relative to a print zone on the medium. The values X and Y are the incremental values of the abscissa and ordinate coordinates. The increment between two adjacent cells fixes the maximum possible definition that can be printed from input data. A set of vectors is represented mathematically by the expression $\{(X0i, Y0i), (X1i, Y1i), i=11\}$ where 0 is the start point, 1 is the end point, and i is the vector index.

In the example, of FIG. 3A, crosses in some of the cells indicate vector start or end points. The coordinates of some of the points are given in parentheses. The vectors may also define a single point in the coordinate matrix to cause a single dot to be printed at the corresponding point of the medium. In this case, the start and end points of the vector coincide (isolated crosses in FIG. 3A).

Figure 4A:
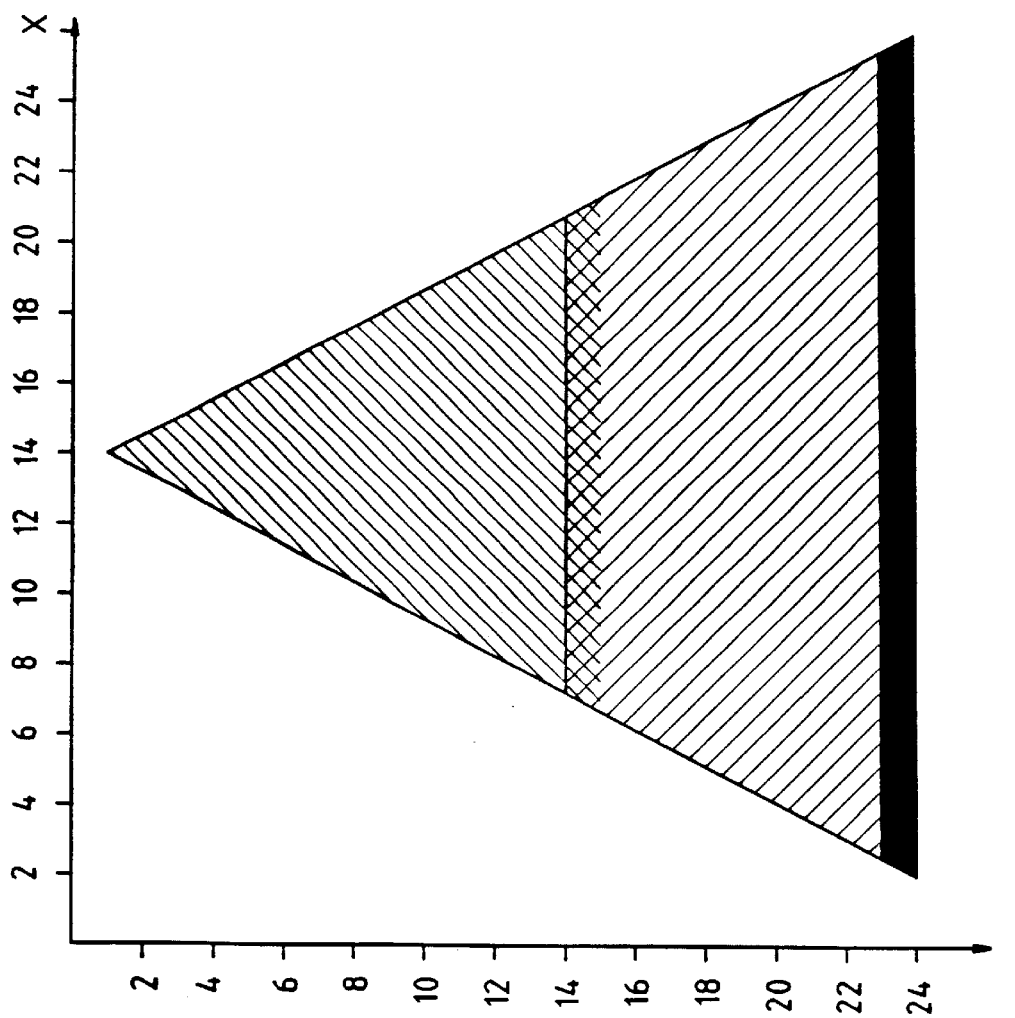
FIG. 4A shows a gray-level graphics pattern according to an embodiment of the present invention.
Figure 4B:
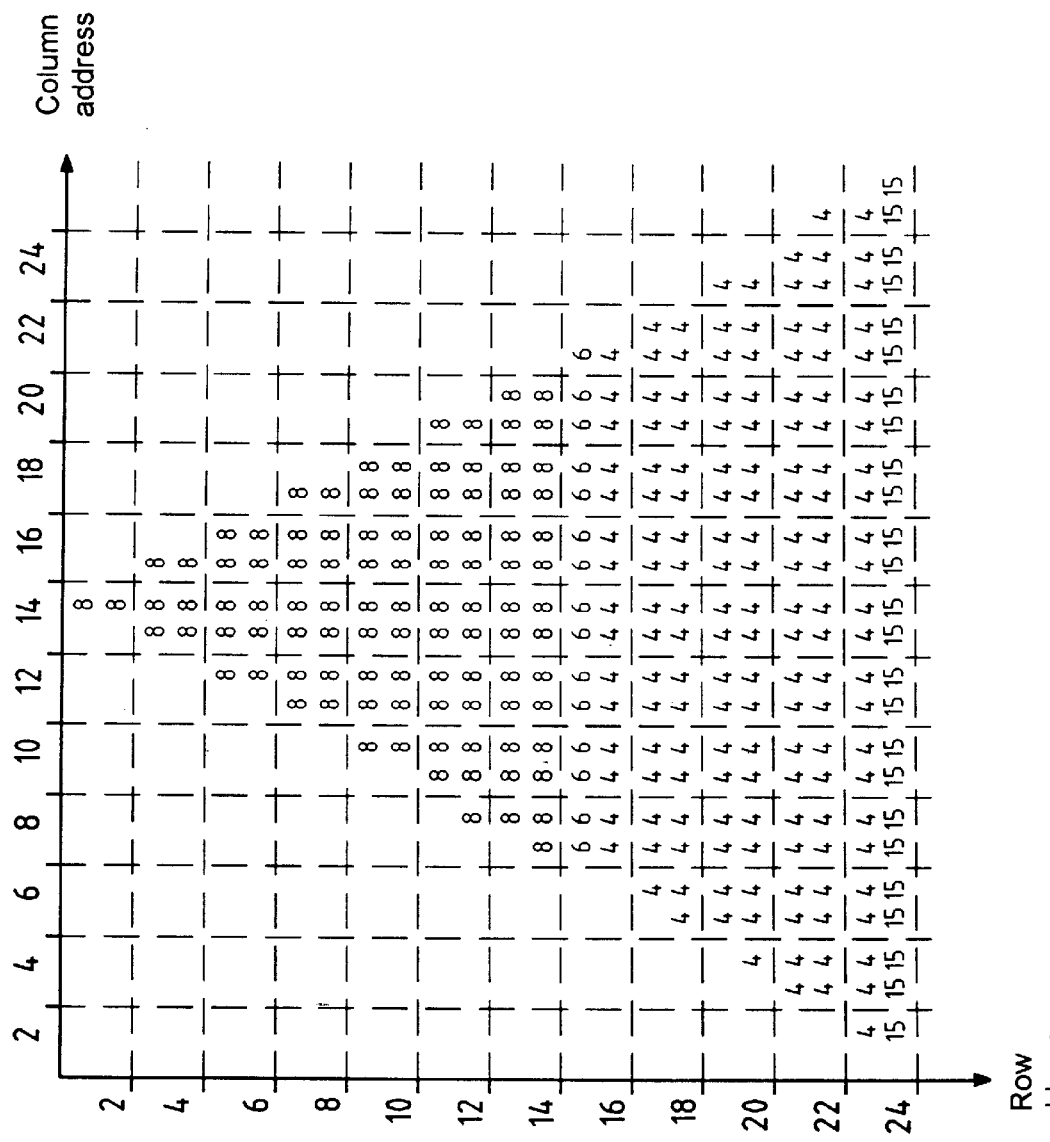
FIG. 4B shows a raster defined by the input image data corresponding to the gray-level pattern of FIG. 4A.

FIG. 4B shows data encoded in the form of a gray-level raster from the pattern of FIG. 4A. The raster is constituted by addressable image points configured in rows and columns. Each point is given a value 0 to 15 as a function of its darkness (in the example, the value "0", which corresponds to a blank point, is not shown). Each image point corresponds to a predetermined point to be printed on the print medium. The set of image points of the raster, which constitutes a map of the image of FIG. 4A, serves as a reference for printing.

It will be observed that the unit increment between two adjacent points of the raster fixes the maximum possible print definition.

Figure 5B:
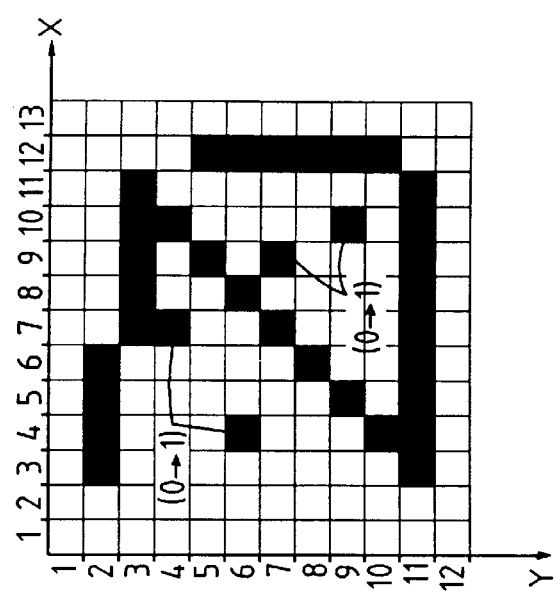
FIG. 5B shows the binary raster of FIG. 5A after a scale reduction is performed in accordance with an implementation of the invention.
Figure 5A:
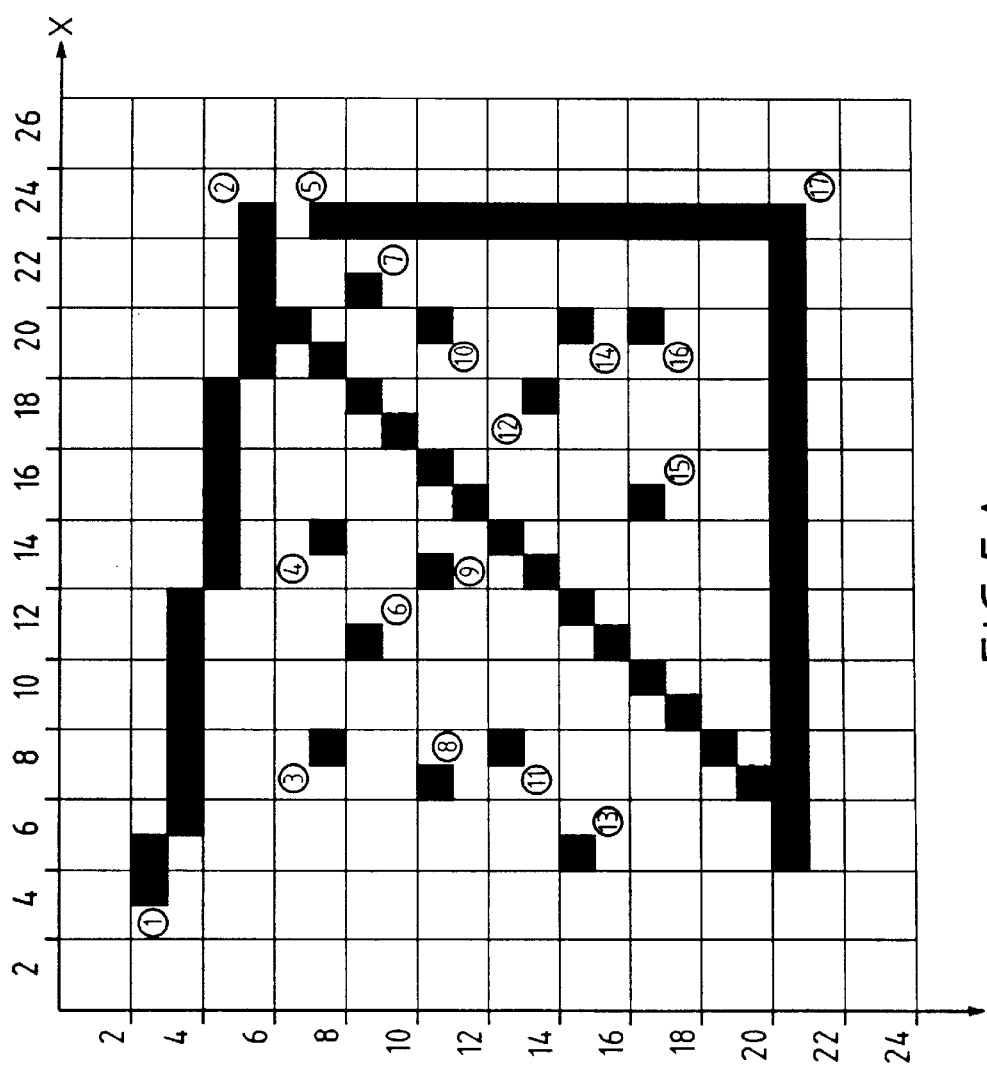
FIG. 5A shows a binary raster according to an embodiment of the present invention.

FIG. 5A shows data encoded in binary raster form. The encoding is the same as for a gray-level raster, except that only two values are possible for each image point: "1" or "0"; corresponding respectively to a point to be printed or to a blank point. In FIG. 5A, raster image points having the value "1" are printed black. Naturally, the above specified correspondence can be inverted, depending on the protocol selected.

Figure 6:
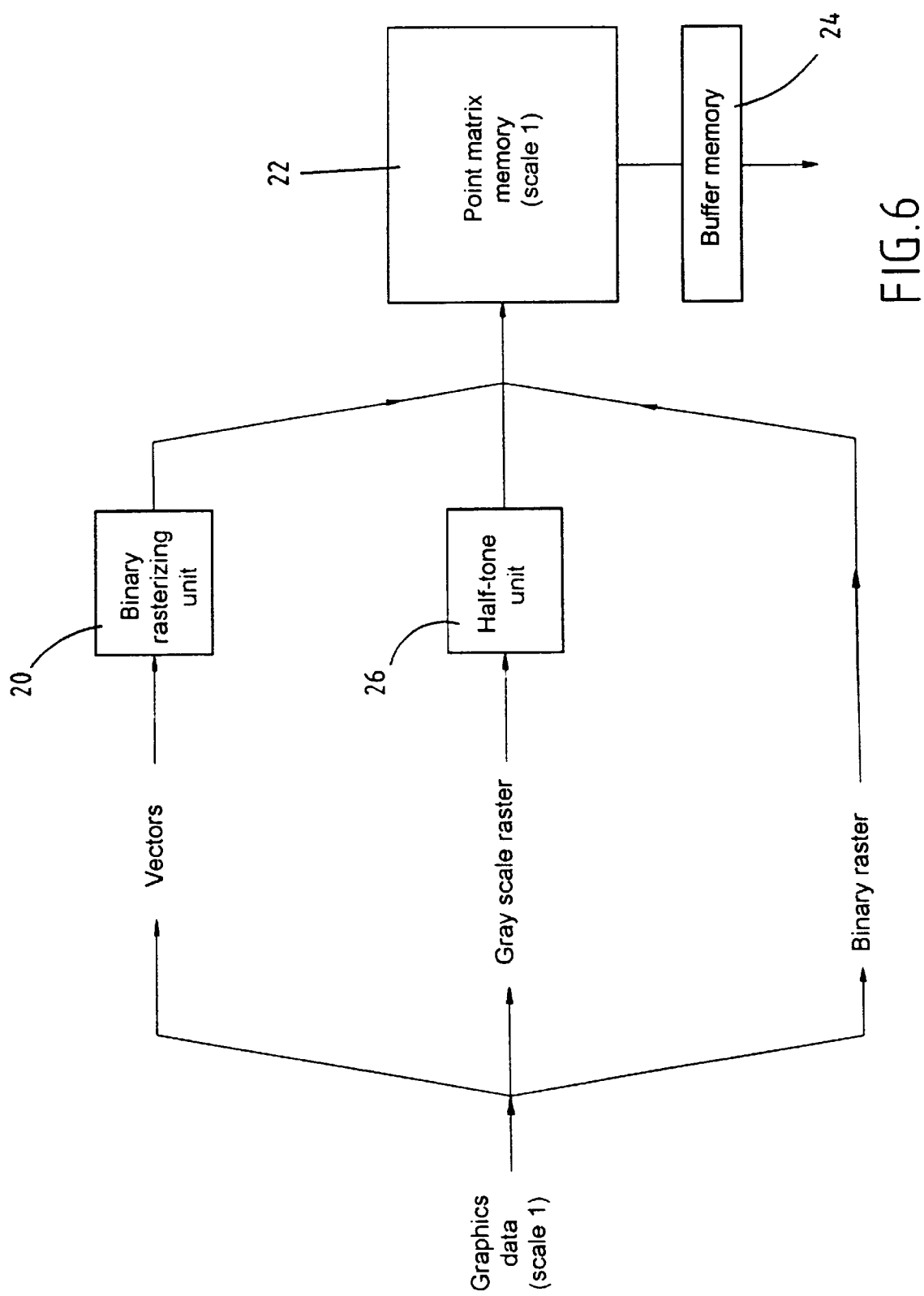
FIG. 6 is a block diagram showing the main steps of transforming input image data for printing without reducing the number of points to be printed.

With reference to FIG. 6, there follows an explanation of the main steps of printing at a normal inking density with the printer operating conventionally, as a function of the above three types of input graphics data.

When the graphics data is in the form of vectors, the vectors are conveyed to a binary rastering unit 20. The unit 20 subdivides the (X, Y) coordinate plane (FIG. 3A) into image points or pixels by giving each cell in the (X, Y) coordinate plane a binary value. In the example, the unit 20 gives the binary value "1" to cells in the coordinate matrix that are crossed by a vector, and also to those containing a vector start point or end point. All other cells of the coordinate matrix are given the binary value "0". The method of transforming vectors into a binary raster is known. The Breshenam algorithm is often used for this purpose.

The binary values calculated in this way are stored in a point matrix memory 22 where they are indexed in a manner that maintains the topography and the scale of the vector coordinate matrix. To this end, the point matrix memory 22 defines an array of rows and columns of cells that correspond to the extracted binary raster.

Cell data is read from the point matrix memory 22 row by row into a buffered memory 24, from which it is transmitted in the form of print data to print control units.

The sequence of data along each row of the point matrix memory corresponds to a sequence of print points in the X direction of the head 10, and the sequence of data in each column corresponds to a sequence of print points in the Y direction of the medium 12 (FIGS. 1 and 2).

When the input data is in the form of a gray-level raster, the raster is initially converted into half-tones by processing in a half-tone unit 26 so as to be transformed into a binary raster having the same scale as the original raster in terms of number of image points. Methods for converting gray-level rasters into binary rasters are well known. For example, it is possible to use space modulation which includes defining areas formed by groups of binary points, each area containing a number of points to be printed that is a function of the gray level to be reproduced.

The points of the binary raster formed in this way are transmitted to the point matrix memory 22 from which they are subsequently read as in the preceding case.

When the input data is already in the form of a binary raster, it is transmitted directly to the point matrix memory 22.

An implementation of the printing material-economizing print method of the invention is explained below as a function of each of the three types of graphics data and with reference to the block diagram of FIG. 7.

In this figure, there can be seen the binary rasterizing unit 20 used for data input in vector form, the unit 26 for converting a gray-level raster into a binary raster, the point matrix memory 22, and the buffer memory 24. The operation of these units is the same as in the case of FIG. 6, and it is therefore not described again.

Similarly, consideration is given to three types of graphics input data that are identical to the preceding cases, taking as examples the vector pattern of FIG. 3A, the gray-level raster of FIG. 4B, and the binary raster of FIG. 5A.

Figures 3B, 3C:
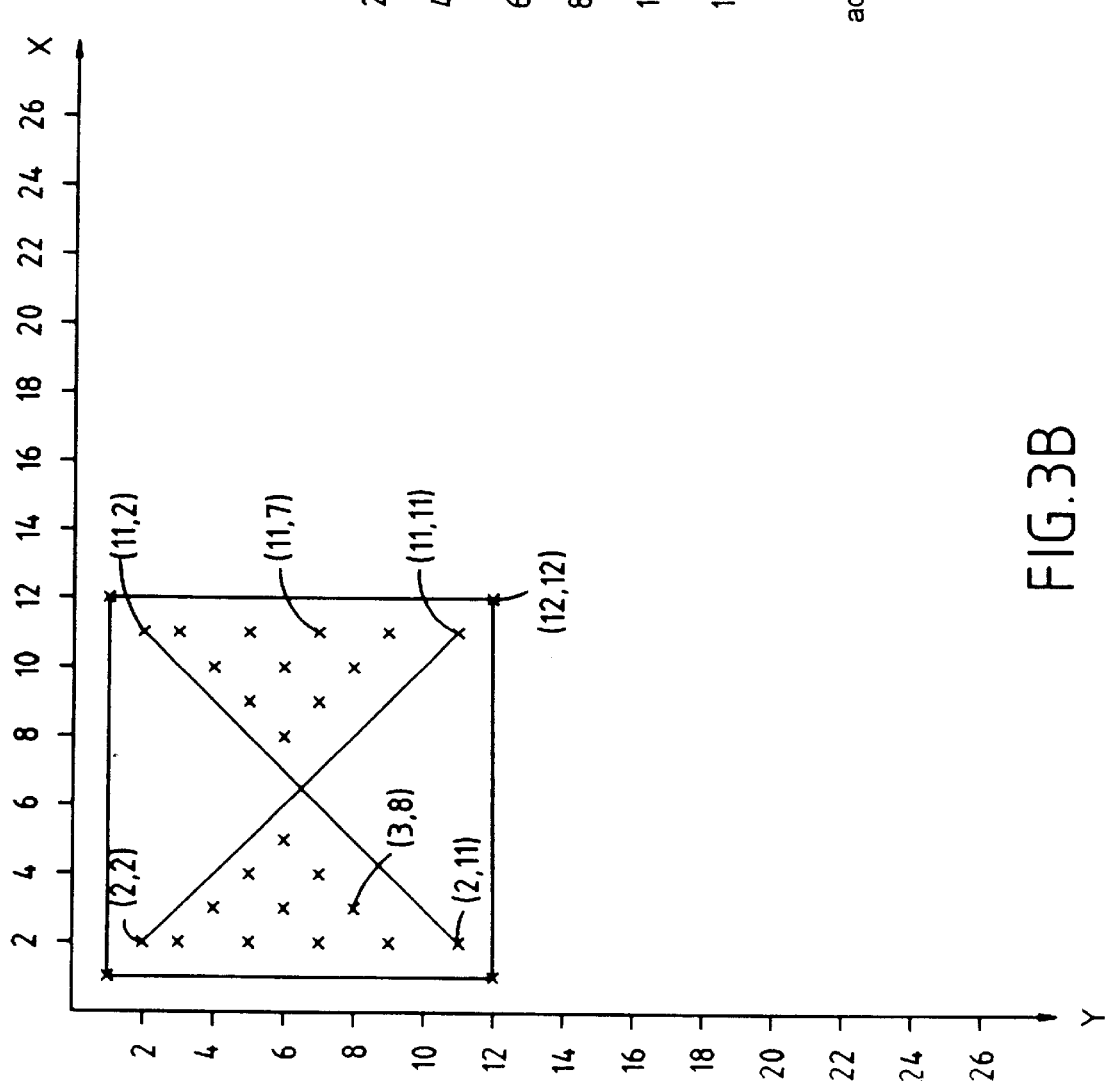
FIG. 3B shows the FIG. 3A vector pattern after a scale reduction by a factor of 2.
FIG. 3C shows a matrix of binary points formed from the reduced vector pattern of FIG. 3B.

When the data representing the input image for printing with ink economy is in vector form, the vectors are subjected to a scale reduction by an n factor. In this example, the scale is reduced by a factor of 2 (by a scale reduction unit 28). Such scale reduction is a conventional operation which includes dividing the coordinates of the start and end points of each vector by the reduction factor, which is equivalent to dividing the definition of the input image by the reduction factor. The vectors are then reconstructed on the original coordinate matrix on the basis of these new coordinates. Starting from the example of FIG. 3A, vectors reduced in accordance with this method are shown in FIG. 3B.

Thereafter, the rasterizing unit 20 forms a binary raster on the basis of the vectors at reduced scale. The way in which "1" or "0" values are allocated to the image elements in the binary raster is identical to the way this is done for vectors in conventional print mode, and can therefore be based on the Breshenam algorithm. The binary raster corresponding to the reduced scale vectors is shown in FIG. 3C. Compared with the binary raster obtained from the vectors at the original scale, this raster is reduced by a factor of 2 in rows and in columns, and the time required to compute the raster is also reduced by a factor of 2.

The reduced scale raster is transmitted to the point matrix memory 22 from which it is transferred row by row into the buffer memory 24.

However, in order to restore the original image format on printing, the reduced scale raster is reconfigured by adding blank points in the rows and columns. For this purpose, the following rules may be adopted:

a blank point is added between two points in each row of the reduced binary raster; and a row of blank points is added between two rows of points in the reduced binary raster.

In the example, blank points are inserted between two points in each row within the buffer memory 24. To this end, the buffer memory 24 receives a sequencer of "0" binary data from a "0" value insertion unit 30. This unit 30 is controlled by a scale-restoring control unit 32 so that a "0" value is inserted alternatively with each point along each row.

For example, consider an isolated sequence S1 of eight bits: . . . 11011101 . . . in a row of the point matrix stored in the buffer memory 24, the unit 30 transforms the sequence S1 into the following sequence S2: . . . 1010001010100010 . . . by inserting "0" after each bit of the S1.

Rows of blank points are inserted between each pair of rows downstream from the buffer memory 24 by a "0" value row insertion unit 34 for inserting rows of value "0" and a switch 36, controlled by the scale-restoring control unit 32. The switch 36 has two inputs respectively receiving the output from the buffer memory 24 and the output from the unit 34 for inserting lines of value "0", and it has one output from which print data is taken.

The switch 36 selectively transmits one of its two inputs at a frequency which is twice the row transfer frequency from the buffer memory 24. As a result, the print data output from the switch 36 includes one row of "0" value points for each row of data in the buffer memory 24. In the above example, the sequence S2 is thus transformed into a data block S3 covering two line:

. . . 000000000000000 . . .

. . . 1010001010100010 . . .

It will be observed that the final configuration of the print data does not depend on the order in which blank rows and columns are inserted. It is also possible to envisage other algorithms for inserting "0" values to expand the configuration of the data in the point matrix so as to return to the original scale of the input image.

For example, for an image that has been reduced by a factor 2, it is possible to insert blank points in a staggered row or column pattern in the raster to be printed. The raster data stored in the memory 24 is then staggered in rows or columns in the raster to be printed using a complementary pattern.

Compared with normal print mode, the number of points having the value "1" (corresponding to points to be printed) is reduced by about 75% when the input image is reduced by a factor equal to 2. This results in a corresponding reduction in the quantity of printing material used.

Figure 4C:
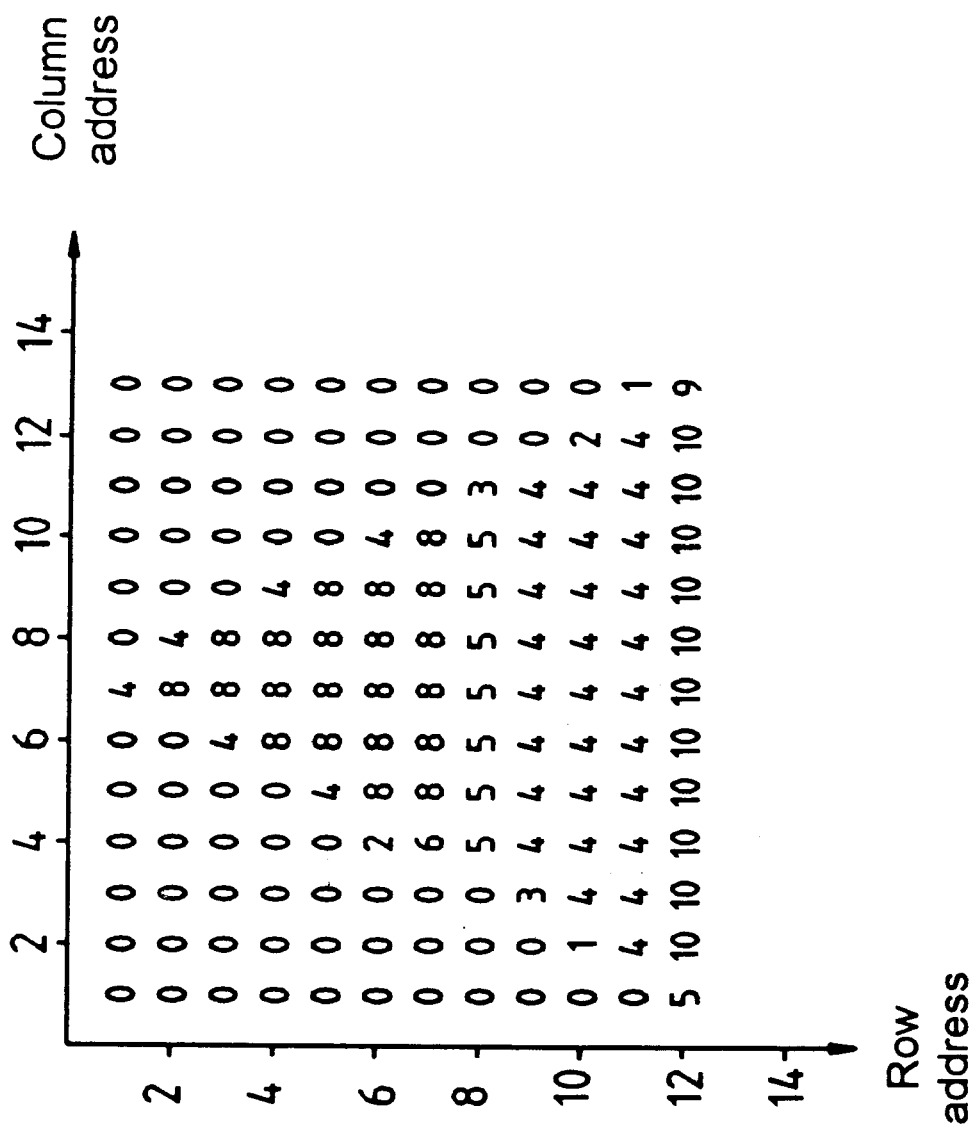
FIG. 4C shows the gray-level raster of FIG. 4B after a scale reduction by a factor of 2.

When the input image data is in gray-level raster form (FIG. 4B) the scale of the data is initially reduced, e.g. by a factor of 2 (n=2), in a gray-level raster reduction unit 38. This unit 38 creates a raster at reduced scale by giving each point in this raster a value representation of the data in a block of four points in the input raster, each block comprising two contiguous image points in the row direction and two contiguous image points in the column direction thereof. Techniques for reducing the scale of image rasters are known. In this example, the gray-level raster reducing unit 38 determines the above-mentioned representative value as being the mean of the values of the gray levels of the elements of the block. This gray-level raster at reduced scale is shown in FIG. 4C.

The reduced scale gray-level raster is then transmitted to the half-tone unit 26 where it is put into half-tone form as a binary raster having the same reduced scale.

This binary raster is then transmitted to the point matrix memory 22. The data from the memory containing the binary raster is then read to the buffered memory 24 and processed by the units 30 to 36 in the same manner as for data in vector form, as discussed above, so as to reconstitute a raster at the original scale.

When the image data is already in the form of a binary raster, it is subjected to scale reduction by a factor of n (e.g., n=2) in a binary raster reducing unit 40. This reduction is performed in the same manner as in the raster reducing unit 38 for gray-level rasters, except that the representative value given to each point in the reduced raster corresponding to a block of four points in the input binary raster is computed in application of the following rules. The representative value corresponds to a point to be printed, if:

i) half or more of the points in the blocks of four points in the input binary raster are points to be printed; or ii) only one point in the block is a point to be printed and the block is the N.m-th block in a run of not-necessarily consecutive blocks each containing only one point to be printed, using any systematic method of counting blocks, where N is a run of integers 1, 2, 3, . . . , and where m is a predetermined integer, preferably equal to 4, i.e. to the square of the scale reduction factor.

In all other cases, the representative value corresponding to a blank point.

FIG. 5B is a diagram showing the binary raster of FIG. 5A after the scale reduction in application of the above rules is performed.

The four-point blocks in the input binary raster for which only one point has binary value "1" are identified in FIG. 5A (by ringed numbers). In this example, these blocks are counted by scanning the rows successively starting from the first. Counting is restricted to the pattern shown and is not re-started for each row or each column, although that may be done in practice. In general, any counting method can be used for performing above rule ii), provided that the rule ensures that one isolated point out of every m isolated points is printed.

In FIG. 5B, the points in the binary raster at reduced scale that have been given a "1" value by rule ii) are identified by the symbol (0→1). They correspond to each block identified in FIG. 5A by a count value which is a multiple of m=4.

Figure 7:
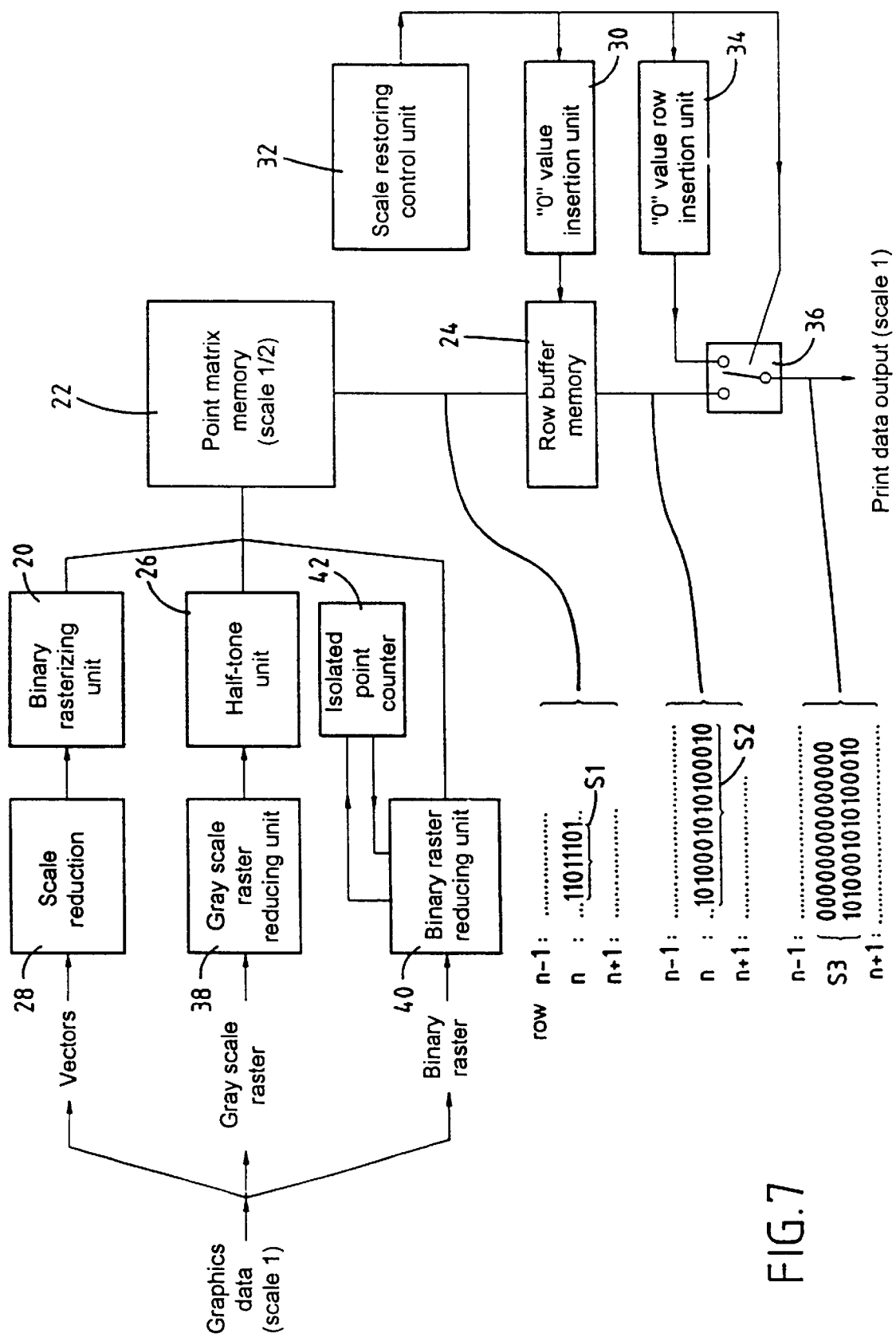
FIG. 7 is a block diagram showing the main steps of transforming the input image data for printing while economizing the printing material, in application of the present invention.

Counting is performed by an isolated point counter unit 42 (FIG. 7).

Rule ii), which is optional in the context of the present invention, serves to identify isolated points in a pattern and to retain one point in four isolated points. Application of this rule is advantageous when a distribution of isolated points causes half-tones to be shown.

The binary raster reduced in this way by the unit 40 is transmitted directly to the point matrix memory 22. Thereafter, data processing which is identical to that performed in the two preceding cases is performed.

Figure 8A:
FIG. 8A is an example of an image printed on an ink-jet printer in a print mode without reduction of the number of points to be printed according to an embodiment of the present invention.
Figure 8B:
FIG. 8B is an example of an image that was originally identical to that of FIG. 8A but printed while economizing the printing material in application of the present invention.

For a better understanding of the result of printing in ink economy mode (or draft mode) in accordance with the invention. FIG. 8A shows an image that is printed in high quality mode with an ink-jet printer starting from input image data in the form of a binary raster, while FIG. 8B shows the same image printed in ink-economy mode after application of above rules i) and ii) according to the present invention. It will be observed that the half-tones (obtained by space modulation of points to be printed or "dithering") are well preserved, in spite of the large reduction in the quantity of ink used.

The above-described examples of the method of printing with print economy are just as applicable to color printing as to monochrome printing. In color printing, each color component, and optionally the black component, of a pattern is processed separately and in the same manner for scale reduction, raster computation, and insertion of blank image points.

It should also be observed that the scale reduction factor can be any real number, not necessarily an integer. The invention makes it possible to use known reduction algorithms that enable a reduced-scale raster to be computed over a quasi-continuous range of reduction factors starting from image data in vector or raster form. More generally, the present invention can be implemented with any image reduction technique, it being understood that reduction by an integer scale factor, and in particular a factor equal to two, requires computation that is relatively simple and fast and provides the desired savings of print and of energy without degrading the information content of the image unacceptably.

Finally, the point matrix computed from the reduced scale image may be other the binary, e.g. ternary or quaternary, depending on the printing technology used. Each point of the matrix may then define a value selected from a set of discrete values specifying either a number of dots to be printed in a zone corresponding to a single print point, or else the size of the dot to be printed, so as to reproduce print points with varying intensity.

The invention being thus described it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of printing raster images while economizing printing resources, starting from input image corresponding to a predetermined original format, the method comprising the steps of:

reducing the input image relative to the original format;

on the basis of the reduced image, forming a reduced raster of image points each defining either a point to be printed or a blank point of the image;

enlarging said reduced raster of image points to return to the original format by inserting blank image points in the reduced raster by a predetermined filling procedure; and printing an image on the basis of the raster of image points enlarged to the original format.

2. A method according to claim 1, characterized in that the input image is reduced by a scale factor of n, where n is a real number greater than 1.

3. A method according to claim 2, characterized in that the number n is an integer number greater than or equal to 2.

4. A method according to claim 3, characterized in that the number n is equal to 2.

5. A method according to claim 3, wherein the raster enlargement step includes adding n-1 blank image point(s) between two points in each row of image points in the reduced raster, and adding n-1 row(s) of blank points between two rows of image points of the reduced raster.

6. A method according to claim 2, wherein, when data on the input image is in the form of vectors specified relative to a coordinate plane, the reduction step includes dividing a definition of the input image by n.

7. A method according to claim 2, wherein, when data on the input image is in the form of a raster, the reduction step includes forming a reduced raster in which each point is given a representative value representing the data in a predetermined neighborhood zone of an input raster and having topographical correspondence with said point.

8. A method according to claim 7, wherein said neighborhood zone is composed of a block of n×n points constituted by n contiguous image points in the row direction and n contiguous image points in the column direction of the input raster.

9. A method according to claim 7 or 8, characterized in that, when the input raster is a gray-level raster, said representative value is an average of the gray level values in said neighborhood zone.

10. A method according to claim 7, wherein, when the input raster is a binary raster in which each point has one or the other of two values defining a point to be printed and a blank point, said representative value is computed as a function of the points of said neighborhood zone.

11. A method according to claim 8, wherein, when the input raster is a binary raster in which each point has one or the other of two values defining a point to be printed and a blank point, said neighborhood zone is a 2×2 point block and said representative value corresponds to a point to be printed if half or more of the points of the block are points to be printed, and corresponds to a blank point otherwise.

12. A method according to claim 8, wherein, when the input raster is a binary raster in which each point has one or the other of two values defining a point to be printed and a blank point, said neighborhood zone is a 2×2 point block and said representative value corresponds to a point to be printed if:

half or more of the points of the block define a point to be printed; or only one point of the block is a point to be printed and the block is the N.m-th block in a run of not-necessarily consecutive blocks each containing a single point to be printed, where N is a run of integers 1, 2, 3, . . . , and where m is a predetermined integer such that the reduced raster includes one point to be printed for each set of m input raster blocks containing only one point to be printed in each block.

13. A method according to claim 12, characterized in that m is equal to 4.

14. A method according to claim 1, wherein, for color printing, said reducing, forming and enlarging steps are performed for each color component.

15. An apparatus for printing rasterized images while economizing printing resources, starting from input image corresponding to a predetermined original format, the apparatus comprising:

means for reducing the input image relative to the original format;

means for forming a reduced raster of image points on the basis of the reduced image, each image point defining either a point to be printed or a blank point of the image;

means for enlarging the reduced raster of image points to return to the original format by inserting blank image points in the reduced raiser by a predetermined filling procedure; and means for printing an image on the basis of the raster of image points enlarged to the original format.

16. An apparatus according to claim 15, wherein the means for reducing the input image are designed to implement reduction by a scale factor of n, where n is a real number greater than 1.

17. An apparatus according to claim 16, wherein n is an integer number greater than or equal 2.

18. An apparatus according to claim 17, wherein n is equal to 2.

19. An apparatus according to claim 17, wherein the means for enlarging the raster operates by inserting n-1 blank image point(s) between two points in each row of image points in the reduced raster, and by adding n-1 row(s) of blank points between two rows of image points in the reduced raster.

20. An apparatus according to claim 16, wherein, when data on the input image is in the form of vectors specified relative to a coordinate plane, the means for reducing operates by dividing a definition of the input image by n.

21. Apparatus according to claim 16, wherein, when data on the input image is in the form of a raster, the means for reducing operates by forming a reduced raster in which a representative value is given to each point representing data in a predetermined neighborhood zone of an input raster and having topographical correspondence with said point.

22. An apparatus according to claim 21, wherein said neighborhood zone is composed of a block of n×n points constituted by n contiguous image points in the row direction and n contiguous image points in the column direction of the input raster.

23. An apparatus according to claim 21, wherein, when the input raster is a gray-level raster, said representative value is an average of the gray level values in said neighborhood zone.

24. An apparatus according to claim 21, wherein, when the input raster is a binary raster in which each point has one or the other of two values defining a point to be printed and a blank point, said representative value is computed as a function of the points of said neighborhood zone.

25. An apparatus according to claim 22, wherein, when the input raster is a binary raster in which each point has one or the other of two values defining a point to be printed and a blank point, said neighborhood zone is a 2×2 point block and said representative value corresponds to a point to be printed if half or more of the points of the block are points are to be printed, and corresponds to a blank point otherwise.

26. An apparatus according to claim 22, wherein, when the input raster is a binary raster in which each point has one or the other of two values defining a point to be printed and a blank point, said neighborhood zone is a 2×2 point block and said representative value corresponds to a point to be printed if:

half or more of the points of the block define a point to be printed; or only one point of the block is a point to be printed and the block is the N.m-th block in a run of not-necessarily consecutive blocks each containing a single point to be printed, where N is a run of integers 1, 2, 3, . . . , and where m is a predetermined integer such that the reduced raster includes one point to be printed for each set of m input raster blocks containing only one point to be printed in each block.

27. An apparatus according to claim 26, wherein m is equal to 4.

28. An apparatus according to claim 15, wherein, for color printing, said means for reducing the input image, said means for forming the reduced raster of points, and said means for enlarging the reduced raster operate on each color component.

29. An apparatus for printing rasterized images while economizing printing resources, starting from input image corresponding to a predetermined original format, the apparatus comprising:

a first section reducing the input image relative to the original format;

a second section forming a reduced raser of image points on the basis of the reduced image, each image point defining either a point to be printed or a blank point of the image;

a third section enlarging the reduced raster of image points to return to the original format by inserting blank image points in the reduced raster by a predetermined filling procedure; and a fourth section printing an image on the basis of the raster of image points enlarged to the original format.

* * * * *